United States Patent
Salfelner

(10) Patent No.: US 9,311,587 B2
(45) Date of Patent: Apr. 12, 2016

(54) RFID DEVICE BEING OPERABLE IN A FIRST AND SECOND OPERATING STATE

(75) Inventor: Anton Salfelner, Pernegg (AT)

(73) Assignee: NXP B.V., Eindhoven (NL)

( * ) Notice: Subject to any disclaimer, the term of this patent is extended or adjusted under 35 U.S.C. 154(b) by 4 days.

(21) Appl. No.: 13/263,432

(22) PCT Filed: Apr. 1, 2010

(86) PCT No.: PCT/IB2010/051437
§ 371 (c)(1),
(2), (4) Date: Oct. 7, 2011

(87) PCT Pub. No.: WO2010/116307
PCT Pub. Date: Oct. 14, 2010

(65) Prior Publication Data
US 2012/0025956 A1 Feb. 2, 2012

(30) Foreign Application Priority Data
Apr. 7, 2009 (EP) .................................. 09157553

(51) Int. Cl.
*H04Q 5/22* (2006.01)
*G06K 19/07* (2006.01)

(52) U.S. Cl.
CPC ........ *G06K 19/0723* (2013.01); *G06K 19/0701* (2013.01); *G06K 19/0707* (2013.01); *G06K 19/0712* (2013.01)

(58) Field of Classification Search
CPC .......... G06K 19/0707; G06K 19/0723; G06K 19/0712
USPC ............... 340/10.1, 10.2, 10.3, 10.31, 10.33, 340/10.34, 10.4, 10.42, 10.5, 10.51, 572.1, 340/572.7, 572.3, 572.4, 12.5, 13.25, 505
See application file for complete search history.

(56) References Cited

U.S. PATENT DOCUMENTS

| 4,955,038 A * | 9/1990 | Lee et al. ....................... 375/256 |
| 2003/0162496 A1* | 8/2003 | Liu .............................. 455/11.1 |
| 2004/0217158 A1* | 11/2004 | Wenger et al. .................. 235/33 |
| 2005/0024187 A1 | 2/2005 | Kranz et al. |
| 2005/0156709 A1 | 7/2005 | Gilbert et al. |
| 2005/0237163 A1* | 10/2005 | Lee et al. .................... 340/10.51 |
| 2006/0058075 A1 | 3/2006 | Remy et al. |
| 2006/0214789 A1 | 9/2006 | Posamentier et al. |
| 2006/0267736 A1 | 11/2006 | Tiernay et al. |
| 2008/0036605 A1* | 2/2008 | Pillai ......................... 340/572.7 |

(Continued)

FOREIGN PATENT DOCUMENTS

| CN | 101128841 A | 2/2008 |
| WO | 2004/053721 A1 | 6/2004 |

OTHER PUBLICATIONS

Search Report for International Patent Application PCT/IB2010/051437 (Oct. 14, 2010).

*Primary Examiner* — Nabil Syed

(57) ABSTRACT

An RFID device (100) being operable in a first and a second operating state, the RFID device comprises a control unit (102), wherein the control unit comprises a configuration input terminal for receiving a configuration signal, and a processing unit (101), which is coupled to the control unit, wherein the control unit is adapted for switching the processing unit between the first and the second operating state based on the configuration signal, wherein the control unit (102) comprises an activation input terminal for receiving an activation signal.

12 Claims, 2 Drawing Sheets

(56) References Cited

U.S. PATENT DOCUMENTS

| | | | |
|---|---|---|---|
| 2008/0136594 A1* | 6/2008 | Jung et al. | 340/10.1 |
| 2008/0136643 A1 | 6/2008 | Yeo et al. | |
| 2008/0238684 A1* | 10/2008 | Tuttle | 340/572.7 |
| 2008/0311861 A1 | 12/2008 | Lepek | |

\* cited by examiner

RFID DEVICE BEING OPERABLE IN A FIRST AND SECOND OPERATING STATE

FIELD OF THE INVENTION

The invention relates to an RFID device being operable in a first and a second operating state.

Beyond this, the invention relates to a method of operating an RFID device being in a first and a second operating state.

Moreover, the invention relates to a program element.

Furthermore, the invention relates to a computer-readable medium.

BACKGROUND OF THE INVENTION

The importance of automatic identification systems increases particularly in the service sector, in the field of logistics, in the field of commerce and in the field of industrial production. Further applications of identification systems are related to the identification of persons and animals.

In particular contactless identification systems like transponder systems (for instance using an RFID tag) are suitable for a wireless transmission of data in a fast manner and without cable connections that may be disturbing. Such systems use the emission and reflection/absorption of electromagnetic waves, particularly in the high frequency domain.

For certain RFID applications, it may be required to realize two different power-modes with an RFID integrated circuit (IC). A Low Power Mode may be used requiring low current consumption of the IC. Hence, high read-ranges of the RFID-Tag may be possible. A High Power Mode may be used for applications, where an extended functionality of the IC is required, resulting in an increased current consumption of the IC. There may be two reasons for that. First, the IC itself consumes more current due to extended functionality in the digital or analog part. Second, the IC is supplying current to an externally connected load, another IC or something else, like an actuator. Currently existing tag-designs only have a certain setting of center-frequency, frequency response, bandwidth and quality-factor. Hence the RFID-Tag only has a certain application specific performance depending on these parameters and it is not possible for the tag to react on specific needs of the application like close coupled tags or tags on different types of materials.

U.S. 2005/024187 discloses a radio frequency (RF) communication device comprising means for switching between a low current operating mode and a high current operating mode. The low current operating mode is optimized to conserve power while the RF device is awaiting a wake-up signal from an interrogator. The high current operating mode is optimized to provide antenna matching during backscatter communications so as to maximize the range of backscatter communication between the RF device and the interrogator.

U.S. 2008/136643 discloses an apparatus receiving a radio frequency (RF) signal transmitted from a Radio Frequency Identification (RFID) reader. The apparatus measures the strength of the received RF signal, and controls the power supplied from the power supply unit included in the tag or the power excited by the RF signal to be supplied to the tag according to whether the power excited by the received RF signal exceeds a level necessary to operate the tag based on the measured strength of the RF signal.

U.S. 2008/311861 discloses a transponder comprising a capacitor for storing power transmitted via an air interface and an arithmetic logic unit that can be supplied with the stored power. A capacitor voltage of the capacitor is compared with a first threshold and with a second threshold, whereby the first threshold and the second threshold are different. In a first operating mode, when the capacitor voltage is above the first threshold, the arithmetic logic unit performs a number of routines with a different priority. In a second operating mode, when the capacitor voltage is between the first threshold and the second threshold, a number of low-priority routines are stopped and a number of high-priority routines are continued.

OBJECT AND SUMMARY OF THE INVENTION

It is an object of the invention to provide an RFID device being operable in a first and a second operating state integrating both power-modes into a single RFID device and still maintaining an optimized efficiency of the RFID device for both power modes.

In order to achieve the object defined above, an RFID device being operable in a first and a second operating state, a method of operating an RFID device in a first and a second operating state, a program element and a computer-readable medium according to the independent claims are provided.

According to an exemplary embodiment of the invention, an RFID device being operable in a first and a second operating state is provided, wherein the RFID device comprises a control unit, wherein the control unit comprises a configuration input terminal for receiving a configuration signal, and a processing unit, which is coupled to the control unit, wherein the control unit is adapted for switching the processing unit between the first and the second operating state based on the configuration signal.

According to another exemplary embodiment of the invention, a method for operating an RFID device in a first and a second operating state is provided. The method may comprise receiving a configuration signal at a configuration input terminal of a control unit, and switching a processing unit, which is coupled to the control unit, between the first and the second operating state based on the configuration signal.

According to still another exemplary embodiment of the invention, a program element (for instance a software routine, in source code or in executable code) is provided, which, when being executed by a processor, is adapted to control or carry out an operating method having the above mentioned features.

According to yet another exemplary embodiment of the invention, a computer-readable medium (for instance a semiconductor memory, a CD, a DVD, a USB stick, a floppy disk or a hard disk) is provided, in which a computer program is stored which, when being executed by a processor, is adapted to control or carry out an operating method having the above mentioned features.

Operating an RFID device in a first and a second operating state which may be performed according to embodiments of the invention can be realized by a computer program that is by software, or by using one or more special electronic optimization circuits, that is in hardware, or in hybrid form, that is by means of software components and hardware components.

The term "RFID device" may denote a transponder adapted for wireless communication. More generally, an RFID device may be a device (for instance comprising a chip) which may automatically transmit certain (for example encoded) data when activated by a special signal from an interrogator. Such an RFID device may be adapted for communication with a communication partner device such as a reader device. The term "reader device" may denote a base station adapted for sending an electromagnetic radiation beam for reading out an RFID device and detecting a back reflected signal. Such a reader device may be an RFID reader, for instance.

The term "control unit" may denote any kind of unit which may change its configuration. It may be for example a frontend block. The control unit as well as the geometric positions of feedpoints may be designed in order to satisfy specific electric requirements. The control unit may configure itself to influence the behavior of the overall system to operate in the first or the second operating state. For this purpose, the control unit may comprise a configuration input terminal for receiving a configuration signal which is indicative of a configuration for the first or the second operating state.

The term "processing unit" may denote an integrated circuit for storing and processing information, modulating and demodulating a radio frequency signal and other specialized functions. The processing unit may be coupled to the control unit. The processing unit may be an integrated circuit (IC). The IC may comprise an analog and a digital part.

The control unit may be adapted for switching the processing unit between the first and the second operating state based on the configuration signal. When the processing unit is switched between the two operating states, the complete RFID device may be switched between the two operating states. Therefore, the control unit may for example influence a setting of center-frequency, a frequency response, a bandwidth and a quality-factor. Hence the RFID tag or device may have a plurality of application specific performance depending on these parameters and may therefore react on specific needs of the application like close coupled tags or tags on different types of materials.

The term "close coupled tags" may denote that there is a plurality of tags directly about one another, for example ten tags. By using common technologies, these tags would be inoperative as all tags would like to start in a high power mode and the available energy would not be sufficient for all tags. This may be improved by using a default low power mode for tags, i.e. that all tags may be started in the low power mode. Hence, all tags may be operable even though they may be in a restricted mode. Following the starting, one tag may be chosen by a random process to switch to a high power mode in order to be readout. The chosen tag may switch to the high power mode while all other tags may remain in the low power mode. Therefore, the available energy may be sufficient for all tags, especially for the tag in the high power mode. After a successful transaction, the chosen tag may switch again to the low power mode and another tag may be chosen to switch to high power mode.

The term "tags on different types of materials" may denote that a tag may have not enough energy available as the tag be mounted on a material which affects negatively the absorption of energy by the tag for example by a modified resonance frequency. According to the example mentioned above, the tag may start in a low power mode. Subsequently, the tag or the control unit of the tag may optimize the operating parameter, for example fine adjusting or configuration of the resonance frequency. Then, the tag may switch to the high power mode as more energy is now available.

The processing unit and the control unit may also be realized in one single unit (for instance as a single electronic chip) or the processing unit may be part of the control unit, or vice versa. The processing unit and the control unit may be monolithically integrated in an integrated circuit (IC). Hence, embodiments of the invention may allow saving time and energy during performance of operating an RFID device even when being used on space restricted platforms.

In the following, further exemplary embodiments of the device will be explained. However, these embodiments also apply to the method, to the program element and to the computer-readable medium.

The control unit may be adapted for switching the RFID device between a low-power mode and a high power mode. A low-power mode may denote low current consumption of the processing unit or IC. Hence high read-ranges of the RFID device or RFID tag may be possible. A high power mode may denote a mode in which applications may be executed wherein an extended functionality of the IC is required, resulting in an increased current consumption of the IC. This may be the case if the IC itself consumes more current due to extended functionality in the digital or analog part. This may also be the case if the IC is supplying current to an externally connected load, for example another IC or any other device like an actuator.

The configuration signal may be an external configuration signal. This configuration signal may be received for example by an antenna from an external source like a reading device. It may also be send by the processing unit to the control unit. Further, the configuration signal may be received by an antenna and subsequently converted and/or handled by the processing unit in order to generate a signal, which may be received by the control unit.

The configuration signal may be determined based on a random process. The random process may be performed for example in the processing unit and subsequently the configuration signal may be sent to the control unit.

The control unit may comprise an activation input terminal for receiving an activation signal. The activation signal may be sent from the processing unit to the control unit or may be received from an external source via an antenna. The activation signal may cause the control unit to activate or deactivate itself.

The RFID device may comprise a further control unit, wherein the further control unit comprises a further configuration input terminal for receiving a further configuration signal, wherein the further control unit is coupled to the processing unit, and wherein the further control unit is adapted for switching the processing unit between the first and the second operating state based on the further configuration signal.

The device may comprise two or more different control units or frontends. The different control units or frontend blocks itself as well as the geometric positions of feedpoints may be designed differently in order to satisfy specific electric requirements. Each frontend block may be equipped with a separate activation input terminal in order to make it possible to switch each frontend block on or off separately. Furthermore each frontend block or control unit may receive a configuration signal. Through specific choice of a configuration set, that means frontends switched on or off, choosing different feedpoints, configuration of frontend blocks, different tuning or power-modes, the behavior of the overall system can be influenced so that different operating states may be realized with one RFID device with one processing unit.

The configuration signal and the further configuration signal may be providable by an antenna element. The antenna element may be for example a shorted dipole antenna or any other kind of standard antenna.

The configuration signal may be receivable from a feedpoint of the antenna element and the further configuration signal may be receivable from a further feedpoint of the antenna element. By using different feedpoints it may be realized that the control units receive different configuration signals at different times. Further, different configurations may be realized for the different control units.

The device may be adapted for wireless communication with a communication partner device, particularly a reading device, for reading data from the device. For this purpose, the device and the reading device may comprise corresponding transmission elements. For instance, the device may comprise an antenna, wherein the reading device may comprise a corresponding receiving antenna. However, the inventive device is not limited to wireless or contactless data transmission, but in principle also applies to wired communication.

In the following, further exemplary embodiments of the method will be explained. However, these embodiments also apply to the device, to the program element and to the computer-readable medium.

The method may further comprise modifying a configuration of the control unit based on the configuration signal. Thus, one control unit may be used for different operating states by modifying the configuration for example including tuning modes.

The method may further comprise activating the control unit in the first operating state and deactivating a further control unit in the first operating state. Thus, each control unit may be used for a different operating state. The control unit and the further control unit may be adapted so that each control unit has a configuration for a specific operating state. By activating the control unit and deactivating the further control unit, the first operating state, for example a low power mode, may be started.

The method may further comprise activating the further control unit in the second operating state and deactivating the control unit in the second operating state. Thus, a second operating state may be started, for example a high power mode.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
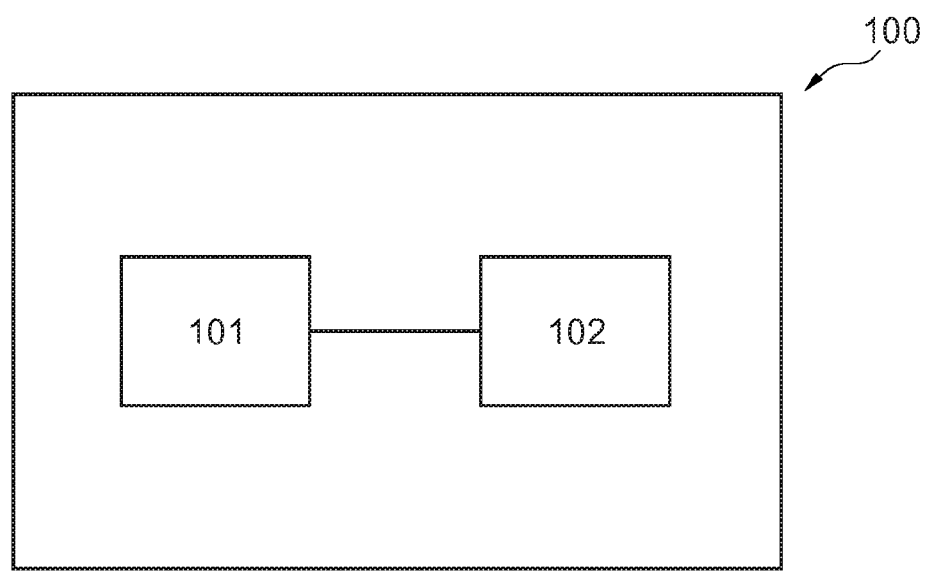
FIG. 1 illustrates an RFID device being operable in a first and a second operating state according to an exemplary embodiment of the invention.

The illustration in the drawing is schematically. In different drawings, similar or identical elements are provided with the same reference signs.

FIG. 1 illustrates an RFID device 100 being operable in a first and a second operating state according to an exemplary embodiment of the invention The RFID device 100 comprises a processing unit 101 and a control unit 102. The processing unit 101 and the control unit 102 are connected together for communication. They may also be provided as one single unit or may be monolithically integrated in an integrated circuit (IC). The control unit 102 may be a computer hardware component responsible for operating the RFID device 100 and the processing unit 101 in two operating states.

The control unit 102 comprises a configuration input terminal for receiving a configuration signal. The configuration signal may be sent internally from the processing unit 101 or from an external source like a reading device via an antenna element. The control unit 102 is adapted for switching the processing unit 102 between the first and the second operating state based on the configuration signal. By switching the processing unit 101 and thereby also the complete RFID device 100 between the two operating states, especially a low power mode and a high power mode, the RFID device 100 may be used for different specific requirements only by configuring the control unit 102 via a configuration signal.

The configuration signal may be an external configuration signal, for example received from an external source via the antenna element. The configuration signal may be alternatively determined based on a random process. This random process may be for example performed in the processing unit 101. The processing unit 101 may also in another embodiment generate the configuration signal based on any signals, which may be for example indicative for environmental requirements.

Figure 2:
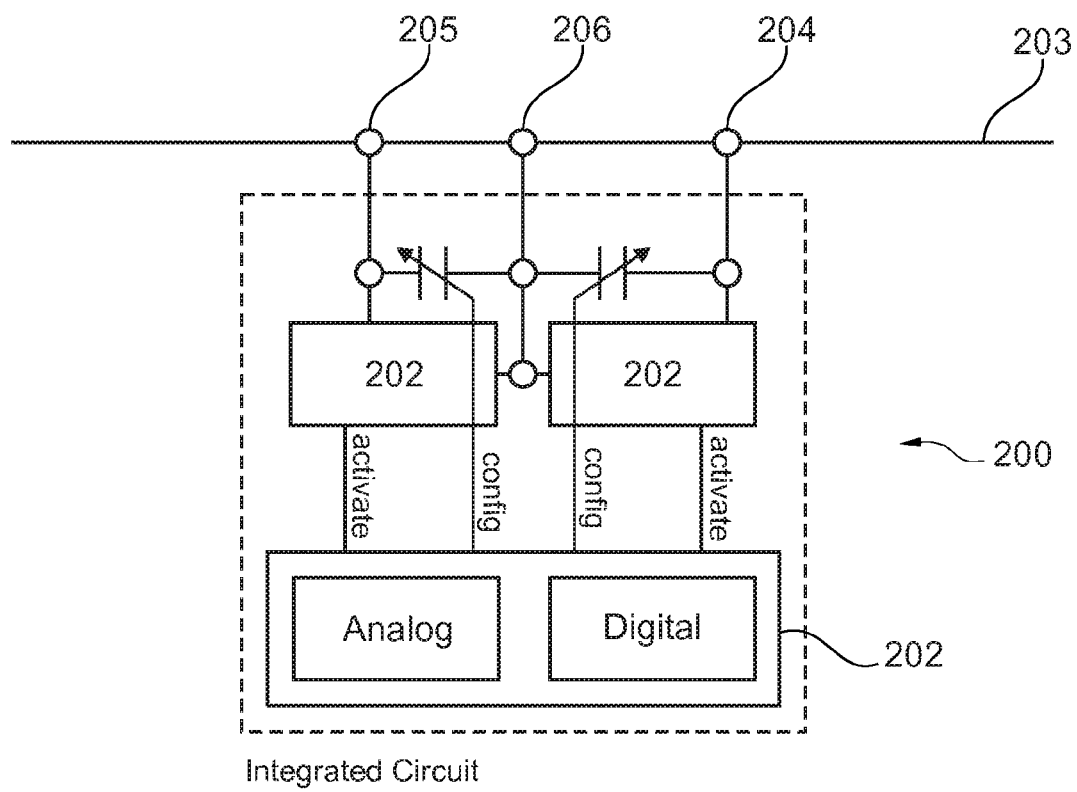
FIG. 2 illustrates an RFID device being operable in a first and a second operating state according to a further exemplary embodiment of the invention.

FIG. 2 illustrates an RFID device 200 being operable in a first and a second operating state according to a further exemplary embodiment of the invention. According to this embodiment, the RFID device 200 may be realized with one or more different control units 202 or frontends. A realization with two frontends 202 is illustrated but also more frontends or control units would be possible. The control units 202 use a shorted dipole-antenna 203. Alternatively other known antenna types may be used as well. The frontend blocks 202 itself as well as the geometric positions of the feedpoints 204, 205 may be designed differently in order to satisfy specific electric requirements. The RFID device 200 has a common connection 206 to the antenna element 203. Each frontend block 202 is equipped with a separate activation input terminal in order to make it possible to switch each frontend block or control unit 202 on or off separately. Therefore, an activation signal may be received. Furthermore each frontend block 202 has a configuration input terminal for receiving a configuration signal. Through specific choice of a configuration set, for example frontends switched on/off, choosing different feedpoints, configuration of frontend blocks, different tuning/power-modes, the behavior of the overall system can be influenced in a positive way.

One frontend block 202 may be designed as a low power version and the other frontend block 202 may be designed as a high power version. As an example, the low power frontend may be a frontend which is loaded by a current of 5 uA on its output. The high power frontend may be loaded by a current of 1 mA, which is several orders of magnitudes higher than for the low power frontend. Due to the high dynamic range of the requirements, the two frontends or control units 202 are designed completely different. The high power frontend is switched off during the first activation of the RFID device or tag in order to keep the loading as small as possible. Due to the fact that only the low power frontend is switched on, the current loading is low and hence the operating range of the RFID device 200 is high. In this condition, the RFID device 200 already has full low power functionality, which would not be possible with the high power frontend being switched on simultaneously. The reason for that is not only the current loading of the high power frontend, but also the bad impedance due to the high power frontend causing significant power reflections and hence a loss of range of the low power frontend even if the high-power-frontend does not consume any current yet.

Triggered through an external command the high power mode is activated. Alternatively, the RFID device 200 itself may decide to switch into the high power mode or change the configuration by itself. The switching may also be based on a random process.

With the help of the energy supply of the low power mode, the RFID device 200 may activate the high power mode by sending an activation signal to the further control unit or frontend 202. The activation of the high power mode may change the behavior of the complete system and therefore it is advantageous to make a new adjustment of the configuration in order to reach an optimized system performance for this new operating condition again.

Hence, the high power frontend may operate at its maximum efficiency since the design itself as well as the antenna feeding could have been laid out in a maximally optimized way.

In the following, referring to FIG. 3, a communication system 300 according to an exemplary embodiment of the invention will be explained.

The communication system 310 comprises a reader 320 and a transponder 340.

The reader 320 comprises a processor 322 (such as a microprocessor or a central processing unit) which is communicatively coupled with an emitter antenna 324 and a receiver antenna 326. The emitter antenna 324 is capable of transmitting a communication message 328 to the transponder 340. The receiver antenna 326 is capable of receiving a communication message 330 from the transponder 340. Although the transmission antenna 324 and the receiver antenna 326 are illustrated as two different antennas in FIG. 3, alternative embodiments may also use a single common shared transceiver antenna.

The antennas 324, 326 are electrically coupled with the processor 322 so that data may be sent from the processor 322 to the transmission antenna 324 for transmission as a communication message 328. A communication message 330 received by the receiver antenna 326 may also be analyzed and processed by the processor 322.

A storage unit 332 such as a semiconductor memory is coupled with the processor 322 so as to allow storing data accessible for the processor 322. Furthermore, an input/output unit 334 is shown which allows a user to operate the reader device 320. The input/output unit 334 may comprise input elements such as buttons, a keypad, a joystick or the like. Via such input elements, a user may input commands to the reader device 320. Furthermore, the input/output unit 334 may comprise a display unit such as a liquid crystal display allowing to display results of the reading procedure of the reader device 320 visible for a user.

Figure 3:
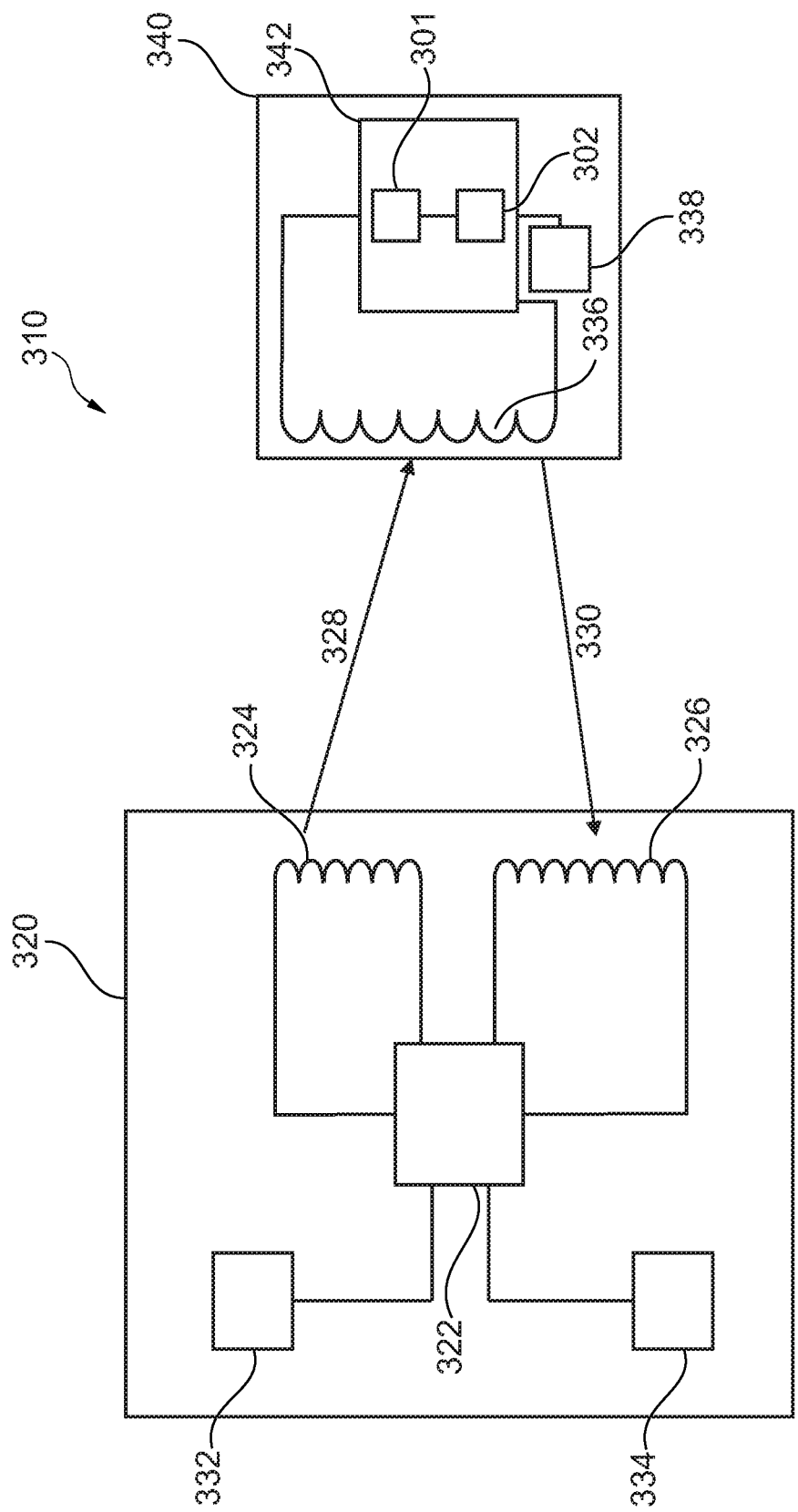
FIG. 3 illustrates a communication system comprising the device of FIG. 1 in combination with a reading device according to an exemplary embodiment of the invention.

As can be further taken from FIG. 3, the transponder or RFID device 340 comprises a transmission and receiver antenna 336, a processor 342 such as a microprocessor and a memory 338. In an embodiment, the memory 338 and the processor 342 may be monolithically integrated in an integrated circuit (IC) which can be connected to the antenna 336 and attached to a support 344 such as a piece of fabric.

The communication messages 328, 330 can be exchanged in a wireless manner between the entities 320, 340.

As can be taken from FIG. 3, the communication messages 328 and 330 can be exchanged between the reader 320 and the transponder 340.

A processing unit 301 corresponding to the processing unit of FIGS. 1 and 2 as well as one or more control units 302 corresponding to the control units of FIGS. 1 and 2 may be comprised in the processor 342 of FIG. 3 as shown or may be arranged separately.

It should be noted that the term "comprising" does not exclude other elements or features and the "a" or "an" does not exclude a plurality. Also elements described in association with different embodiments may be combined. It should also be noted that reference signs in the claims shall not be construed as limiting the scope of the claims.

The invention claimed is:

1. An RFID device being operable in a first and a second operating state, the RFID device comprising
 a first control unit including electronic circuitry, a first configuration input terminal and a first activation input terminal, the first control unit configured and arranged to
  receive, via the first configuration input terminal, a first configuration signal, and
  receive, via the first activation input terminal, a first activation signal, and
  operate in an active mode based on reception of the first activation signal, different from the first configuration signal;
 a second control unit including electronic circuitry, a second configuration input terminal and a second activation input terminal, the second control unit configured and arranged to
  receive, via the second configuration input terminal, a second configuration signal,
  receive, via the second activation input terminal, a second activation signal, and
  operate in an active mode based on reception of the second activation signal, different from the second configuration signal; and
 a processing unit including electronic circuitry is communicatively coupled to the first and second control units, the processing unit configured and arranged to
  switch, based on at least one of the configuration signals, between a first operating state and a second operating state having higher power than the first operating state,
  generate the first activation signal in response to the first operating state, and
  generate the second activation signal in response to the second operating state.

2. The RFID device according to claim 1, wherein the first control unit, in response to the first configuration signal, modifies parameters of the RFID device from the group consisting of: center-frequency, frequency response, bandwidth, quality-factor, and combinations thereof.

3. The RFID device according to claim 1, wherein
 the first configuration signal is an external configuration signal.

4. The RFID device according to claim 1, wherein
 the first configuration signal is determined based on a random process.

5. The RFID device according to claim 1, wherein the first configuration signal and the second configuration signal are providable by an antenna element.

6. The RFID device according to claim 5, wherein the first configuration signal is receivable from a feedpoint of the antenna element and the second configuration signal is receivable from a further feedpoint of the antenna element.

7. The RFID device according to claim 1, wherein the RFID device is adapted for a wireless communication with a communication partner device, particularly a reading device, for reading data from the RFID device.

8. Method for operating an RFID device in a first and a second operating state, the method comprising:
 receiving a first configuration signal at a first configuration input terminal of a first control unit that includes electronic circuitry, receiving a first activation signal at a first activation input terminal of the first control unit, operating the first control unit in an active mode based on reception of the first activation signal, different from the first configuration signal, receiving a second configuration signal at a second configuration input terminal of a second control unit that includes electronic circuitry, receiving a second activation signal at a second activation input terminal of the second control unit, operating the second control unit in an active mode based on reception of the second activation signal, different from the second configuration signal;

switching a processing unit including electronic circuitry, coupled to the processing unit, between the first and the second operating states based on at least one of the configuration signals, the second operating state corresponding to a higher power state than the first operating state, and generating, using the processing unit, the first and second activation signals in response to the first and second operating states, respectively, activating or deactivating the control units based on receipt of a respective one of the activation signals.

9. Method according to claim 8, further comprising
modifying a configuration of the first control unit based on the first configuration signal.

10. Method according to claim 8, further comprising
activating the first control unit in the first operating state and
deactivating the second further control unit in the first operating state.

11. Method according to claim 10, further comprising
activating the second control unit in the second operating state and
deactivating the first control unit in the second operating state.

12. A non-transitory computer-readable medium, in which a computer program for operating an RFID device in a first and a second operating state is stored, which computer program, when being executed by a processor, is adapted to carry out or control a method according to claim 8.

* * * * *